US012664506B2

(12) United States Patent
Banerjee et al.

(10) Patent No.: US 12,664,506 B2
(45) Date of Patent: Jun. 23, 2026

(54) METHOD AND SYSTEM FOR GENERATING KEY PERFORMANCE INDICATOR PREDICTION MODEL FOR MULTI-CLOUD APPLICATIONS

(71) Applicant: Tata Consultancy Services Limited, Mumbai (IN)

(72) Inventors: Sujoy Banerjee, Kolkata (IN); Tanmoy Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 136 days.

(21) Appl. No.: 18/380,294

(22) Filed: Oct. 16, 2023

(65) Prior Publication Data

US 2024/0127158 A1     Apr. 18, 2024

(30) Foreign Application Priority Data

Oct. 18, 2022     (IN) .............................. 202221059541

(51) Int. Cl.
G06Q 10/0639          (2023.01)
(52) U.S. Cl.
CPC .............................. G06Q 10/06393 (2013.01)
(58) Field of Classification Search
None
See application file for complete search history.

(56) References Cited

U.S. PATENT DOCUMENTS

| | | |
|---|---|---|
| 10,693,743 B2 | 6/2020 | Zhong et al. |
| 2014/0278807 A1 | 9/2014 | Bohacek |

| | | | |
|---|---|---|---|
| 2018/0309637 A1* | 10/2018 | Gill | H04L 41/122 |
| 2021/0019194 A1* | 1/2021 | Bahl | H04L 67/1031 |

(Continued)

FOREIGN PATENT DOCUMENTS

| | | | | |
|---|---|---|---|---|
| EP | 3 382 546 A1 | 10/2018 | | |
| WO | WO-2016118979 A9 * | 12/2016 | | G06N 5/01 |

OTHER PUBLICATIONS

Ajitpal Singh, et al. Hierarchical Multi-Log Cloud-Based Search Engine, 2014 Eighth International Conference on Complex, Intelligent and Software Intensive Systems (Year: 2014).*

(Continued)

*Primary Examiner* — Jerry O'Connor
*Assistant Examiner* — Matthew H Divelbiss
(74) *Attorney, Agent, or Firm* — FINNEGAN, HENDERSON, FARABOW, GARRETT & DUNNER LLP

(57) ABSTRACT

This disclosure relates generally to method and system for generating key performance indicator prediction model for multi-cloud applications. The disclosed method determines an optimized resource model and a predictive cost structure for one or more multi-cloud applications. The method receives a composite usage request to obtain a current resource consumption metrics and a cost structure for each cloud application identifier (ID). Further, a set of cloud provider API endpoints are invoked to obtain a plurality of usage tracking metrics. Further, a plurality of views are generated for each cloud application ID by processing every record associated with each API response file with allocated resource data. Then, a KPI prediction model is generated by leveraging autoregressive integrated moving average on the KPI time series data to determine an optimized resource model and a cost structure.

10 Claims, 6 Drawing Sheets

(56)  References Cited

U.S. PATENT DOCUMENTS

| 2022/0109692 | A1* | 4/2022 | Hebert | G06F 9/547 |
| 2022/0200869 | A1* | 6/2022 | Erlingsson | H04L 67/10 |
| 2022/0342910 | A1* | 10/2022 | Dinh | G06F 9/544 |

OTHER PUBLICATIONS

Lee et al., "Towards Understanding Cloud Usage through Resource Allocation Analysis on XSEDE".

* cited by examiner

300 receive from a one or more multi-cloud hosted application, a composite usage request to obtain a current resource consumption metrics and a cost structure for each cloud application identifier (ID), and simultaneously a set of cloud application identities (ID) are obtained to fetch one or more associated resource metrics

302 invoke the set of cloud provider API endpoints, to obtain a plurality of usage tracking metrics for each cloud application ID based on an API endpoint calling structure

304 generate a mapping file and an error file for each cloud application ID of each API response file, by performing a meta scan on the output metrics folder

306 generate a plurality of relational tables comprising one or more records mapping in each API response file of each cloud application ID and loading the one or more records into a data staging model for flattening complex nested API response structure stored in each API response file

308

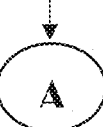

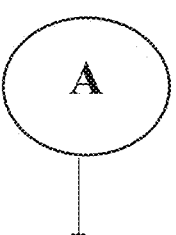

generate a plurality of views for each cloud application ID by processing every record associated with each API response file with allocated resource data, and a cartesian product is performed on one or more unprocessed record of each API response file, wherein the plurality of views comprises an application view, a summary view, and an application summary view

310 compute an API endpoint correlation metric based on a composite metrics, and a composite KPI measure by applying correlation analytics on the plurality of views

312 generate a KPI prediction model leveraging autoregressive integrated moving average (ARIMA) on the KPI time series data to determine an optimized resource model and a cost structure for each cloud application ID based on the application summary view and the API endpoint correlation metrics and generating a report for the plurality of views

METHOD AND SYSTEM FOR GENERATING KEY PERFORMANCE INDICATOR PREDICTION MODEL FOR MULTI-CLOUD APPLICATIONS

PRIORITY CLAIM

This U.S. patent application claims priority under 35 U.S.C. § 119 to: Indian Patent Application No. 202221059541, filed on Oct. 18, 2022. The entire contents of the aforementioned application are incorporated herein by reference.

TECHNICAL FIELD

The disclosure herein generally relates to prediction, and, more particularly, to method and system for generating key performance indicator prediction model for multi-cloud applications.

BACKGROUND

Today, organizations are increasingly adopting cloud for operating enterprise business, devising future proofing solutions to stay relevant in competition. This helps in reducing the overall data center footprint to stay ahead of the operational expenditure (OPEX) curve. Cloud computing is an emerging popular paradigm for on-demand resource allocation and pricing and cloud service providers offer services to consumers at different levels of performance, costs, and configurations. Such cloud-based enterprise business relies on application key performance indicators (KPIs) for sizing and orchestrating cloud resources dynamically. KPIs are monitored to assess achievable performance and to configure various cloud-specific parameters at instances and autoscaling rules among cloud service providers. Usually, retaining KPIs within acceptable levels requires application expertise which is expensive and can slow down the continuous delivery of software. Existing methods relies on cloud specific application KPIs for automating performance analysis and orchestration. Such, application specific metrics limits with generality of solutions and their applicability across cloud applications and platforms.

SUMMARY

Embodiments of the present disclosure present technological improvements as solutions to one or more of the above-mentioned technical problems recognized by the inventors in conventional systems. For example, in one embodiment, a system of generating key performance indicator prediction model for multi-cloud applications is provided. The system includes receiving from a one or more multi-cloud hosted application, a composite usage request to obtain one or more current resource consumption metrics and a cost structure for each cloud application identities (ID). Simultaneously, a set of cloud application (ID) are obtained to fetch one or more associated resource metrics, a cloud provider name associated with each cloud account identifier (ID), a current value of a key reference metric associated with each cloud application, a set of application programming interface (API) endpoints to fetch a current operating cloud metric and a current application metric, and a configuration data connecting each API end point metrics. Further, the set of cloud provider API endpoints are invoked to obtain a plurality of usage tracking metrics for each cloud application ID based on an API endpoint calling structure.

Each API endpoint call an associated API response file is created and stored in an output metrics folder, wherein each API response file includes data associated with each API endpoint. Further, a mapping file and an error file are generated for each cloud application ID of each API response file, by performing a meta scan on the output metrics folder.

Further, a plurality of relational tables comprising one or more records mapping in each API response file of each cloud application ID and loading the one or more records into a data staging model for flattening complex nested API response structure stored in the API response file. Further, a plurality of views for each cloud application ID are generated by processing every record associated with each API response file with allocated resource data. Then, a cartesian product is performed on one or more unprocessed record of each API response file. The plurality of views comprises an application view, a summary view, and an application summary view. The API endpoint correlation metric is computed based on a composite metrics, and a composite KPI measure by applying correlation analytics on the plurality of views. The KPI prediction model is generated by leveraging autoregressive integrated moving average (ARIMA) on the composite KPI time series data to determine an optimized resource model and a cost structure for each cloud application ID based on the application summary view and the API endpoint correlation metrics and generating a report for the plurality of views.

In another aspect, a method of building key performance indicator prediction model for multi-cloud applications is provided. The method includes receiving from a one or more multi-cloud hosted application, a composite usage request to obtain a current resource consumption metrics and a cost structure for each cloud application identifier (ID). Simultaneously, a set of cloud application identity (ID) are obtained to fetch one or more associated resource metrics, a cloud provider name associated with each cloud account identifier (ID), a current value of a key reference metric associated with each cloud application, a set of application programming interface (API) endpoints to fetch a current operating cloud metric and a current application metric, and a configuration data connecting each API end point metrics. Further, the set of cloud provider API endpoints are invoked to obtain a plurality of usage tracking metrics for each cloud application ID based on an API endpoint calling structure. Each API endpoint call an associated API response file is created and stored in an output metrics folder, wherein each API response file includes data associated with each API endpoint. Further, a mapping file and an error file are generated for each cloud application ID of each API response file, by performing a meta scan on the output metrics folder.

Further, a plurality of relational tables comprising one or more records mapping in each API response file of each cloud application ID and loading the one or more records into a data staging model for flattening complex nested API response structure stored in the API response file. Further, a plurality of views for each cloud application ID are generated by processing every record associated with each API response file with allocated resource data. Then, a cartesian product is performed on one or more unprocessed record of each API response file. The plurality of views comprises an application view, a summary view, and an application summary view. The API endpoint correlation metric is computed based on a composite metrics, and a composite KPI measure by applying correlation analytics on the plurality of views. The KPI prediction model is generated by leveraging autoregressive integrated moving average (ARIMA) on the composite KPI time series data to determine an optimized resource model and a cost structure for each cloud application ID based on the application summary view and the API endpoint correlation metrics and generating a report for the plurality of views.

In yet another aspect, a non-transitory computer readable medium for receiving from a one or more multi-cloud hosted application, a composite usage request to obtain a current resource consumption metrics and a cost structure for each cloud application identifier (ID). Simultaneously, a set of cloud application identity (ID) are obtained to fetch one or more associated resource metrics, a cloud provider name associated with each cloud account identifier (ID), a current value of a key reference metric associated with each cloud application, a set of application programming interface (API) endpoints to fetch a current operating cloud metric and a current application metric, and a configuration data connecting each API end point metrics. Further, the set of cloud provider API endpoints are invoked to obtain a plurality of usage tracking metrics for each cloud application ID based on an API endpoint calling structure. Each API endpoint call an associated API response file is created and stored in an output metrics folder, wherein each API response file includes data associated with each API endpoint. Further, a mapping file and an error file are generated for each cloud application ID of each API response file, by performing a meta scan on the output metrics folder.

Further, a plurality of relational tables comprising one or more records mapping in each API response file of each cloud application ID and loading the one or more records into a data staging model for flattening complex nested API response structure stored in the API response file. Further, a plurality of views for each cloud application ID are generated by processing every record associated with each API response file with allocated resource data. Then, a cartesian product is performed on one or more unprocessed record of each API response file. The plurality of views comprises an application view, a summary view, and an application summary view. The API endpoint correlation metric is computed based on a composite metrics, and a composite KPI measure by applying correlation analytics on the plurality of views. The KPI prediction model is generated by leveraging autoregressive integrated moving average (ARIMA) on the composite KPI time series data to determine an optimized resource model and a cost structure for each cloud application ID based on the application summary view and the API endpoint correlation metrics and generating a report for the plurality of views.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B are example flow diagrams illustrating method steps for building key performance indicator (KPI) prediction model adapting multi-cloud applications using the system of FIG. 1, in accordance with some embodiments of the present disclosure.

DETAILED DESCRIPTION

Figure 1:
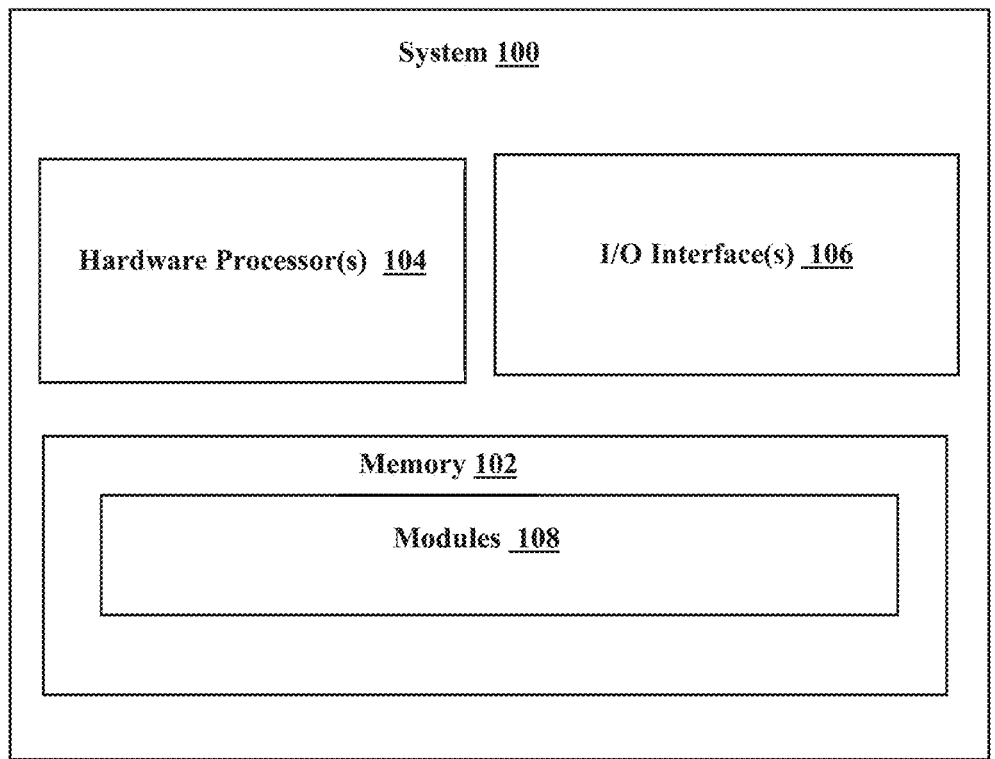
FIG. 1 illustrates an exemplary system for building a key performance indicator (KPI) prediction model in multi-cloud applications, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for building key performance indicator (KPI) prediction model. The system enables to determine an optimized resource model and a predictive cost structure for one or more multi-cloud applications. The disclosed method provides an integrated platform to identify a cloud cost, a cloud resource utilization, a cloud resource monitoring, a cloud performance monitoring, and a business key performance indictor (KPI) dashboard for any cloud application adaptable to the system. The disclosed method is a cloud agnostic analytics platform, and key performance indictor prediction model of the system generates one or more reports based on KPI metrics relevant to each cloud application. The disclosed system is further explained with the method as described in conjunction with FIG. 1 to FIG. 5 below.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary system for building a key performance indicator (KPI) prediction model in multi-cloud applications, in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
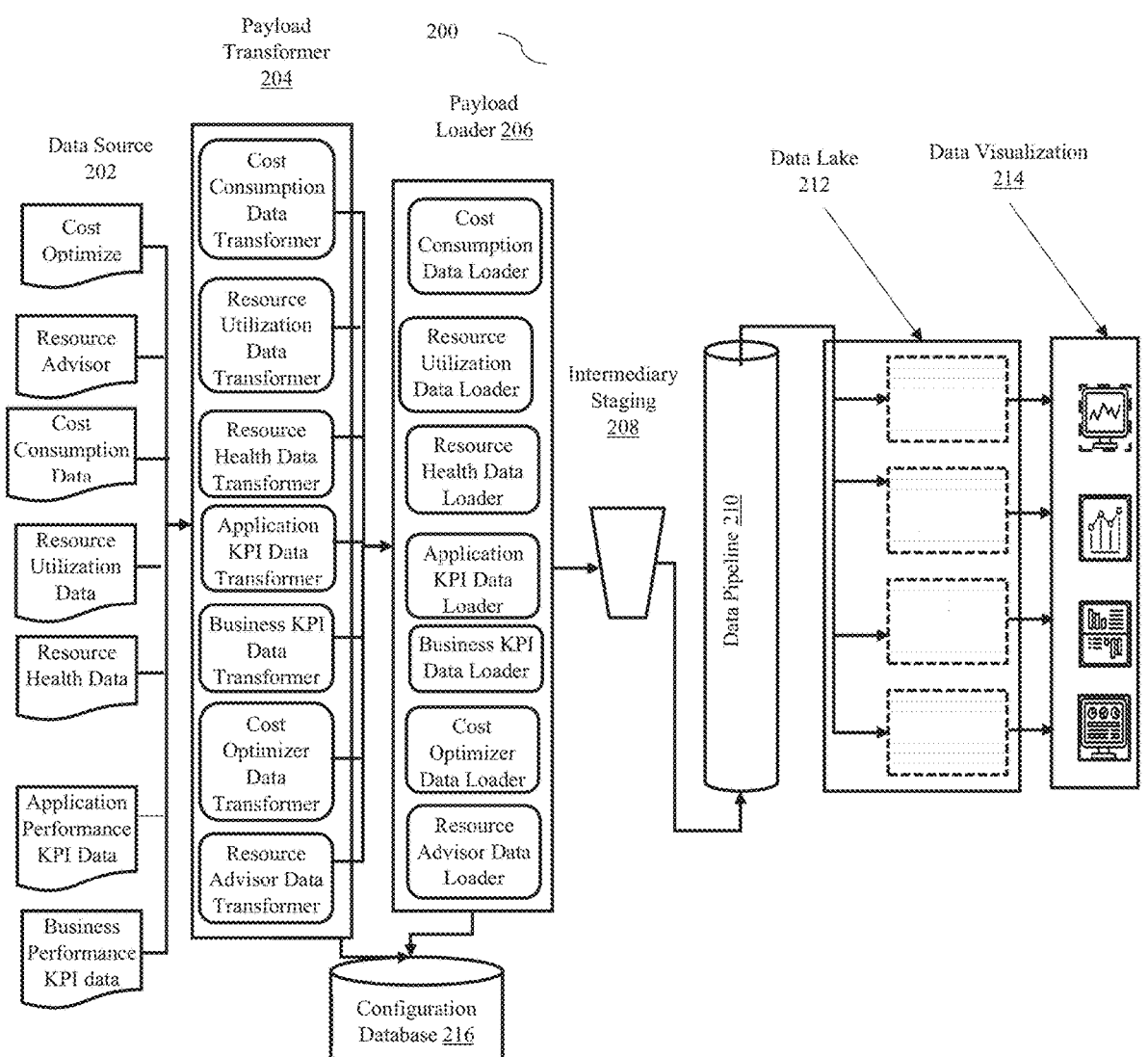
FIG. 2 illustrates a high-level architecture of the key performance indicator (KPI) prediction model for determining optimized resource model and a predictive cost structure in multi-cloud applications using the system of FIG. 1, in accordance with some embodiments of the present disclosure.

FIG. 2 illustrates a high-level architecture of the key performance indicator (KPI) prediction model for determining optimized resource model and a predictive cost structure in multi-cloud applications using the system of FIG. 1, in accordance with some embodiments of the present disclosure. FIG. 2 includes a data source 202, a payload transformer 204, a payload loader 206, an intermediary staging 208, a data pipeline 210, a data lake 212, a data visualization 214, and a configuration database 216.

The data source 202 generates data metrics from one or more sources for example a cloud resource utilization metering application, a cloud health metering application, a cloud cost metering application, an advisory application and thereof. Each cloud application provides one or more of the following: cost optimizer data, a resource advisor data, a cost consumption data, a resource utilization data, a resource health data, an application performance KPI data, and a business performance KPI data in heterogeneous formats. Information extracted from each cloud application data are further processed by the payload transformer 204.

The payload transformer 204 comprises a cost optimizer data transformer, a resource advisor data transformer, a cost consumption data transformer, a resource utilization data transformer, a resource health data transformer, an application performance KPI data transformer, and a business performance KPI data transformer. The payload transformer 204 transforms the heterogeneous data into a homogeneous format. The payload transformer 204 validates the parsed metrics data, and then transforms the metrics data into the homogeneous format.

The payload loader 206 fetches the inputs from the payload transformer 204 for processing. The payload loader 206 comprises a cost optimizer data loader, a resource advisor data loader, a cost consumption data loader, a resource utilization data loader, a resource health data loader, an application performance KPI data loader, and a business performance KPI data loader. The payload loader transforms the batch data into a compressed format to create a new wrapper data packet and then loads the compressed data into a common location.

The intermediary staging 208 fetches the unprocessed compressed packets from the common folder which deposited in the payload loader 206 and feeds to the data pipeline 210. Once the data packet is delivered to the data pipeline, the compressed data packets are moved to a different folder location.

The data pipeline 210 processes the inputs and sequentially provides a one or more reports in data visualization 212. The data pipeline 210 involves a very complex set of data manipulation and loading instruction set which processes the compressed packet through various pipeline stages. The first stage extracts all the resource allocation and the resource utilization data into a flat structure which describes a file directory that can contain only files The second stage extracts the resource cost and the business KPI data. The third stage extracts the resource advisory and the cost optimizer data. Subsequent stages correlate these data set coming from these dimensions to construct a plurality of views.

The data visualization 212 generates the one or more reports of business KPI and application KPI. The data visualization 212 shows different type of reports. Some of the reports are related to applications resource utilization for example how much overutilization, underutilization and optimum utilization happening at the resource level, the business applications KPI versus a cost consumption report, a tabular report showing areas of improvements with relevant descriptive data, and a chart showing predicted cost for cloud applications for future billing cycles.

FIG. 3A and FIG. 3B are exemplary flow diagrams illustrating method steps for building key performance indicator (KPI) prediction model adapting multi-cloud applications using the system of FIG. 1, in accordance with some embodiments of the present disclosure.

Figure 5:
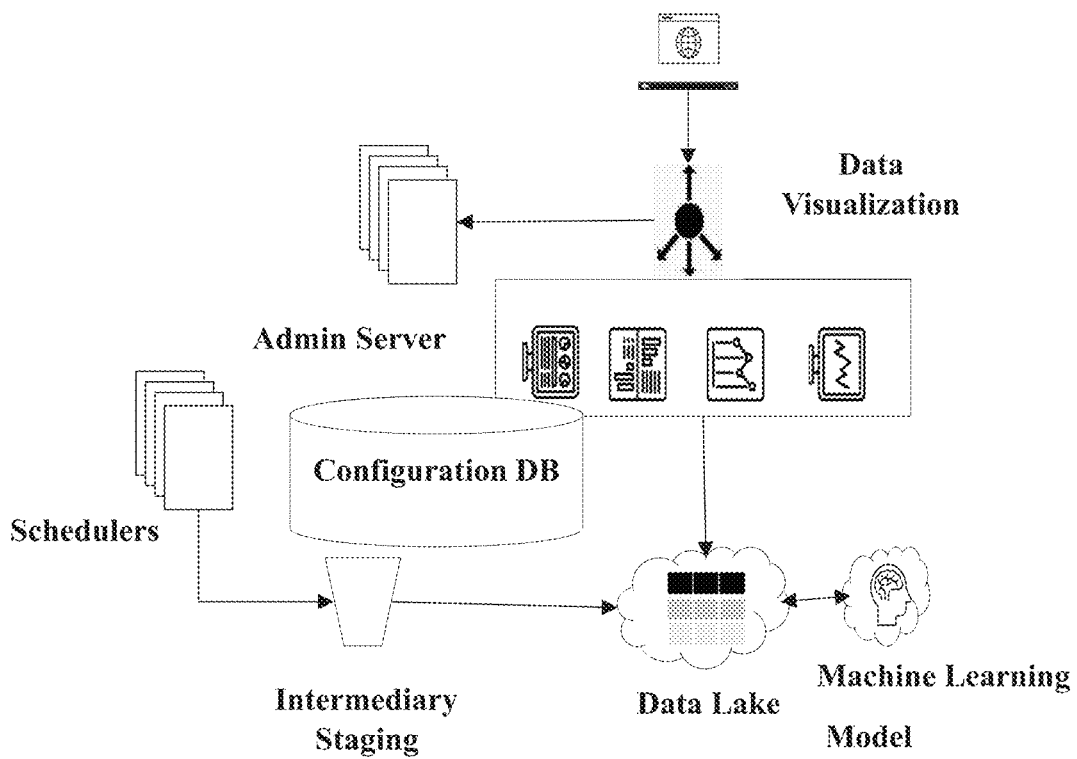
FIG. 5 illustrates an example deployment architecture of the key performance indicator (KPI) of each cloud application using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 5 and the steps of flow diagram as depicted in FIG. 3A and FIG. 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302 receive from a one or more multi-cloud hosted applications, a composite request to obtain a current resource consumption metrics and a cost structure for each cloud application identifier (ID). Simultaneously, a set of cloud application identifier (ID) is obtained to fetch one or more associated resource metrics, a cloud provider name associated with each cloud account identifier (ID), a current value of a key reference metric associated with each cloud application, a set of application programming interface (API) endpoints to fetch a current operating cloud metric and a current application metric, and a configuration data connecting each API end point metric. Assuming the system 100 may receive one or more inputs from one or more cloud sources for example a cloud operational services, a cloud financial operation, a process monitoring services, an application monitoring services, a log analytics services, a business dashboard services and thereof.

A set of application programming interface (API) endpoints includes a cloud resource provider server, a cloud resource monitoring server, a cloud resource metering server, a cloud performance monitoring server, and an application KPI dashboard.

Figure 4:
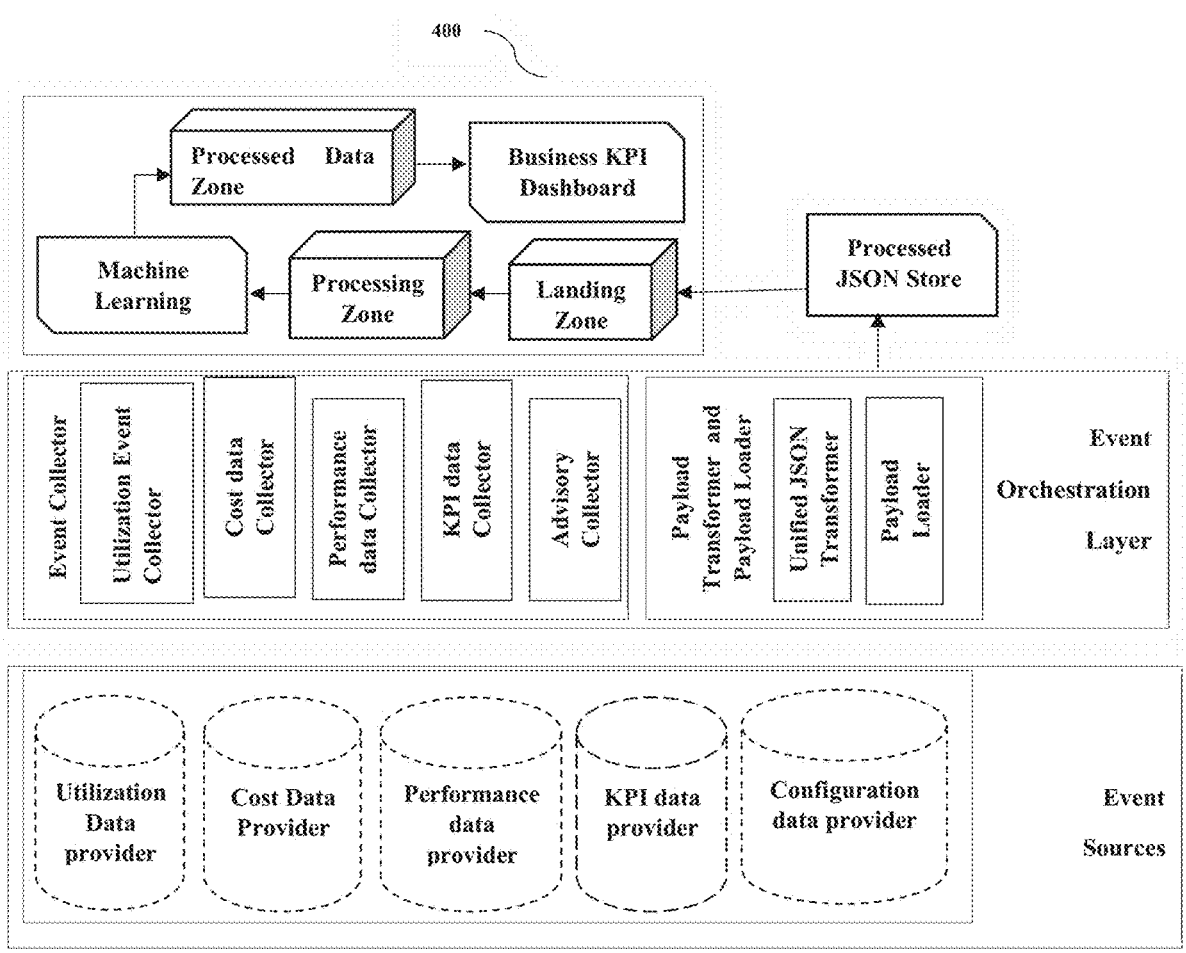
FIG. 4 illustrates implementation architecture of the key performance indicator (KPI) prediction model for the multi-cloud applications using the system of FIG. 1, in accordance with some embodiments of the present disclosure.

FIG. 4 illustrates implementation architecture of the key performance indicator (KPI) prediction model for multi-cloud applications using the system of FIG. 1, in accordance with some embodiments of the present disclosure. The business KPI dashboard includes an event orchestration layer and one or more event sources. The event orchestration layer includes an event collector and a transformers and data loaders.

The event collector includes a utilization event collector, a cost data collector, a performance data collector, a KPI data collector, and an advisory collector. The payload transformer and payload data loader includes a utilization JSON transformer and a payload data loader.

The one or more event sources are fetched from at least one of a utilization data provider, a cost data provider, a performance data provider, a KPI data provider, and a configuration data provider.

Further, one or more current operating cloud metrics includes a resource allocation data obtained from the cloud resource provider server, a resource utilization data from the cloud resource monitoring server, a cost data obtained from the cloud resource metering server, and a performance data obtained from the cloud performance monitoring server.

Referring now to the steps of the method 300, at step 304 invoke the set of cloud provider API endpoints to obtain a plurality of usage tracking metrics for each cloud application ID based on an API endpoint calling structure. For each API endpoint call an associated API response file is created and stored in an output metrics folder. Here, each API response file includes data associated with each API endpoint. It is noted that the API response file may be a JSON file and thereof and the like and the structure of the JSON file is different from each other. The metrics data format of the current resource consumption, the resource allocation, the resource cost, the application KPI data and thereof are structurally and semantically different.

The composite usage request is processed by invoking the set of cloud provider API endpoints. The set of cloud API endpoints includes a cloud resource provider server, a cloud resource monitoring server, a cloud resource metering server, a cloud performance monitoring server, and an application KPI dashboard. The method initially identifies an available cloud resource provider server for servicing to provide requested data. Further, connects to a hyper scalar record to obtain available resource allocation data.

The API endpoint calling structure invokes the set of cloud API endpoints sequentially for each cloud application ID. The cloud resource provider server API endpoint is called by the API endpoint calling structure to extract cloud application specific resource allocation data comprising a CPU, a memory, a storage, a connectivity details, a database, a cache and thereof. Further, a cloud resource provider API response JSON file is created and stored in the output metrics folder.

Further, the API endpoint calling structure calls the cloud resource monitoring server API endpoint to extract cloud resource monitoring data comprising the CPU, the storage metrics, the network metrics and thereof in time series data. Time series data ends at a current time and starts at a previous time in a slice for every cycle of a predefined period. Further, a cloud resource monitoring API response JSON file is created and stored in the output metrics folder.

The API endpoint calling structure calls the cloud resource metering server API endpoint to extract cloud application specific cost data for instance specific and service specific in time series data. The time series data ends at the current time and starts at the previous time in a slice of 20 minutes. Further, the cloud resource metering API response JSON file is created and stored in the output metrics folder.

The API endpoint calling structure calls the cloud performance monitoring server API endpoint to extract a minimum CPU value, a maximum CPU value, an average CPU value, a minimum memory value, a maximum memory value, an average memory value, a volume metrics, a network metrics and thereof as in time series. Time series data extraction ends for every cycle of the predefined period. Further, the cloud performance monitoring API response JSON file is created and stored in the output metrics folder.

The API endpoint calling structure calls the application KPI dashboard API endpoint to extract an application related KPIs like number of transactions in an hour, a number of logins occurred in an hour, a number of registration requests placed in an hour and thereof. This is also a time series data and ends at the current time and starts at the previous time in a slice of one hour. The data is collected in the JSON file and stored in the output metrics folder.

The API endpoint calling structure calls the business KPI dashboard API endpoint to extract the business KPIs such as a number of orders placed, a revenue collected, a revenue recognized, an exit rate, a churn rate for a given time period which ends in the current time and starts at the previous time in a slice of 2 hour. The data is collected in the JSON file and stored in the output metrics folder.

Referring now to the steps of the method 300, at step 306 generate for each API response file, a mapping file, and an error file for each cloud application ID by performing a metadata scan on the output metrics folder. Considering the above example, one or more metadata from each API response JSON file of every API endpoint are extracted that are related to the cloud application ID. Further, the one or more extracted metadata are matched with each cloud application ID having identical metadata from the output metrics folder. Further, a batch of mapping records are created for the one or more identical metadata associated with each API response JSON file and the cloud application ID. Then, a new file is created for one or more unmatched metadata and then stored in the error file. The mapping file and the error file are generated for one or more identical metadata corresponding to each API response JSON file associated with the output metrics folder.

Referring now to the steps of the method 300, at step 308 generate a plurality of relational tables comprising one or more records mapping in each API response file of each cloud application ID and loading the one or more records into a data staging model for flattening complex nested API response structure stored in the API response file. Here, referring to the above example the mapping JSON file is processed for each application ID and all records are loaded into a data staging area. Here, one or more mapping records then undergoes several stages before they the plurality of relational tables is generated for each API response file.

The first stage extracts all the resource allocation and the resource utilization data in each relational table. The second stage extracts the resource cost and the business KPI data and stores in each relational table. The third stage extracts the resource advisory and the cost optimizer data and stores in each relational table. Subsequent stages are then correlated from the data set coming from these dimensions to generate the plurality of relational views.

Each stage includes instructions to flatten complex nested JSON response structure stored in the API response file for each of the metrics type. The output metrics file having the one or more API response file processing time is optimized based on the dimension. Each API response JSON file for every cloud application ID and dimension are merged as one API response file and restored in the output metrics folder.

The stage wise loading mechanism provides significant performance boost by performing a performance test and it is identified when compared to one stage loading. It is noted that the stage process provides 2.5 times performance gain than the one stage process. Once the merged API response JSON files are persisted, the complex flattening code to convert the JSON file into the plurality of relational tables. Further, the mapping file is also loaded as a rule table which is further utilized in later embodiments of the present disclosure. The plurality of relational tables includes at least one of a cloud resource allocation table, cloud resource utilization table, a cloud resource metering table, a cloud performance monitoring table, and an application KPI dashboard table, a cloud application master table, a cloud resource allocation master table, and a cloud metadata map master table.

Referring now to the steps of the method 300, at step 31 generate a plurality of views for each cloud application ID by processing every record associated with each API response file with allocated resource data. Then, a cartesian product is performed on one or more unprocessed record of each API response file. The plurality of views comprises an application view, a summary view, and an application summary view. The application view provides data about cloud applications that includes the resource utilization to identify overutilization of the cloud resource, underutilization and optimum utilization of the cloud resource happening at the resource level. Summary view provides application KPI versus cost consumption report and the application summary view shows areas of improvements with relevant descriptive data, and chart showing predicted cost for cloud applications in future billing cycles.

Here, for each relational table millions of records are created and for every cloud application ID of the cloud application the master table allocates resources identified by using the cloud resource allocation table. Further, for each allocated resource one or more unprocessed records are identified from the cloud resource utilization table, the cloud performance monitoring table, the cloud resource metering table. The cloud metadata map master table joins the one or more attributes from each of the one or more unprocessed records and a cartesian product is obtained to generate the plurality of views. The summary view is listed in Table 1.

TABLE 1

| Summary View | |
| --- | --- |
| Cloud Application ID | Summary View |
| | Environment |
| | Resource_Id |

TABLE 1-continued

| Summary View | |
| --- | --- |
| Cloud Application ID | Summary View |
| | Resource_Type |
| | Resource_Model |
| | Metering_Start_Time |
| | Metering_End_Time |
| | Avg(Metrics-1) |
| | Avg(Metrics-2) |
| | Avg(Metrics-3) |
| | Avg(Metrics-4) |
| | Avg(Metrics-5) |
| | Avg(KPI_1) |
| | Avg(KPI_2) |
| | Avg(KPI_3) |
| | Min(Metrics-1) |
| | Min(Metrics-2) |
| | Min(Metrics-3) |
| | Min(Metrics-4) |
| | Min(Metrics-5) |
| | Min(KPI_1) |
| | Min(KPI_2) |
| | Min(KPI_3) |
| | Max(Metrics-1) |
| | Max(Metrics-2) |
| | Max(Metrics-3) |
| | Max(Metrics-4) |
| | Max(Metrics-5) |
| | Max(KPI_1) |
| | Max(KPI_2) |
| | Max(KPI_3) |

Referring now to the steps of the method 300, at step 312 compute an API endpoint correlation metric based on a composite metrics, and a composite KPI measure by applying correlation analytics on the plurality of views.

The API endpoint correlation metrics obtains the plurality of views comprising the application view, the summary view, and the application summary view. The resource allocation data, the resource utilization data, the cost data, and the performance data are grouped for a predefined interval of time and then business KPI data are grouped for the predefined interval of time.

Further, the composite metrics are computed by summing the resource utilization data multiplied with a first predefined value, the resource cost multiplied with the first predefined value, and the performance data multiplied with the first predefined value and assigning a weightage for the composite metrics as in Equation 1.

$$\text{composite metrics} = 0.33*(\text{cloud resource utilization}) + 0.33*(\text{cloud cost}) + 0.34*(\text{cloud Performance}) \qquad \text{Equation 1}$$

The composite KPI measure is computed by summing a first predefined business KPI value multiplied with a second predefined value, a second predefined business KPI value multiplied with a third predefined value, and a third business KPI value multiplied with a third predefined value as in Equation 2.

$$\text{Composite KPI measure} = 0.2*(\text{KPI}_1) + 0.2*(\text{KPI}_2) + 0.6*(\text{KPI}_3) \qquad \text{Equation 2}$$

API endpoint correlation metrics are generated by plotting the composite metrics and the business KPI value and the business KPI view is generated by plotting the composite metrics and the composite KPI measure. Here, for each cloud application ID resource utilization is to be determined. The historical correlation data is being fed to the corresponding cloud provider's trusted advisory services to obtain the most optimized resource configurations. Once the optimized resource configurations are fetched, the cloud service provider's price engine APIs are invoked to obtain the predictive cost model. Further, the recommended resource type and the cost data are fed back into the application summary view into new columns from the recommended resource model and the recommended resource cost.

Referring now to the steps of the method 300, at step 314 generate a KPI prediction model leveraging an autoregressive integrated moving average (ARIMA) on the Composite KPI Metrics time series data to determine an optimized resource model and a cost structure for each cloud application ID based on the application summary view and the API endpoint correlation metrics and generating a report for the plurality of views.

In one embodiment, a set of reports are generated from the plurality of views. The portfolio summary view report comprises a portfolio level cost, a resource count, a resource distribution data and the like.

The program summary view report comprises of program level cost, resource count, resource distribution data and the like.

The application summary view report comprises of application-level cost, resource count, resource distribution data and the like.

FIG. 5 illustrates an example deployment architecture of the key performance indicator (KPI) of each cloud application using the system of FIG. 1, in accordance with some embodiments of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of predicting multi-cloud application cost and resource model. The embodiment, thus provides a visualization of descriptive analytics of all past data and a predictive model for future cost and cloud resource data utilization. Moreover, the embodiments herein further provides a time travel mechanism to look at different dimensional data in a correlated manner.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for generating key performance indicator (KPI) prediction model in multi-cloud application to monitor and configure various cloud-specific parameters for multi-cloud applications among multiple cloud service providers, comprising:

receiving from one or more multi-cloud hosted application via one or more hardware processors, a composite usage request to obtain one or more current resource consumption metrics and a cost structure for each cloud application identifier (ID), and simultaneously obtaining a set of cloud application identities (ID) to fetch one or more associated resource metrics, a cloud provider name associated with each cloud account identity (ID), a current value of a key reference metric associated with each cloud application, a set of application programming interface (API) endpoints to fetch a current operating cloud metric and a current application metric, and a configuration data connecting each API end point metrics;

invoking the set of API endpoints via the one or more hardware processors, to obtain a plurality of usage tracking metrics for each cloud application ID based on an API endpoint calling structure, wherein for each API endpoint call an associated API response file is created and stored in an output metrics folder, and wherein each API response file includes data associated with each API endpoint, wherein the set of API endpoints include a cloud resource provider server, a cloud resource monitoring server, a cloud resource metering server, a cloud performance monitoring server, and an application KPI dashboard, wherein the set of API endpoints are called the obtain the plurality of usage tracking metrics for each cloud application ID from time series data for a predefined time period, wherein the time series data starts at a previous time in a time slice for every cycle of the predefined time period;

generating for each API response file via the one or more hardware processors, a mapping file, and an error file for each cloud application ID by performing a meta scan on the output metrics folder, wherein the step of generating the mapping file and the error file for each API response file of the cloud application ID comprises:

extracting for each cloud application ID one or more metatags from each API response file of each API endpoint associated with the output metrics folder;

creating a set of mapping records for two or more identical metatags associated with each API response file and the cloud application ID, and creating a new file for one or more unidentical flagged metatags; and generating the mapping file and the error file for the two or more identical metatags corresponding to each API response file associated with the output metrics folder;

generating via the one or more hardware processors, a plurality of relational tables comprising one or more records mapping in each API response file of each cloud application ID and loading the one or more records into a data staging model for flattening complex nested API response structure stored in each API response file;

generating via the one or more hardware processors, a plurality of views for each cloud application ID by processing every record associated with each API response file with an allocated resource data, and performing cartesian product on one or more unprocessed record of each API response file, wherein the plurality of views comprises an application view, a summary view, and an application summary view;

computing via the one or more hardware processors, an API endpoint correlation metric based on one or more composite metrics, and a composite KPI measure by applying correlation analytics on the plurality of views, wherein computing the API endpoint correlation metrics comprises:

obtaining the plurality of views comprising the application view, the summary view, and the application summary view;

grouping (i) the resource allocation data, the resource utilization data, the cost data, and the performance data for a predefined interval of time, and (ii) the business KPI data for the predefined interval of time;

computing the one or more composite metrics by summing the resource utilization data multiplied with a first predefined value, the resource cost multiplied with the first predefined value, and the performance data multiplied with the first predefined value and assigning a weightage for the composite metrics;

computing the composite KPI measure by summing a first predefined business KPI value multiplied with a second predefined value, a second predefined business KPI value multiplied with a third predefined value, and a third business KPI value multiplied with a third predefined value;

generating the API endpoint correlation metrics by plotting the composite metrics and the business KPI value; and generating the business KPI view by plotting the composite metrics and the composite KPI measure; and generating via the one or more hardware processors, a KPI prediction model leveraging an autoregressive integrated moving average (ARIMA) on the composite KPI time series data to determine an optimized resource model and a predictive cost structure for each cloud application ID based on the application summary view and the API endpoint correlation metrics and generates a report for the plurality of views, determining the optimized resource model and the predictive cost structure for each cloud application ID by:

determining for each cloud application ID, resource utilization, and feeding historical correlation data to corresponding cloud provider's advisory services to obtain most optimized resource configurations, and after fetching the most optimized resource configuration, invoking corresponding cloud service provider's price engine APIs to obtain the predictive cost structure; and dynamically monitoring the KPIs in real-time for multi-cloud applications from multiple cloud service providers by utilizing the optimized resource model and the predictive cost structure to assess achievable performance of the multi-cloud applications and to configure various cloud-specific parameters at time instances for multi-cloud applications among multiple cloud service providers.

2. The processor implemented method as claimed in claim 1, wherein the one or more current operating cloud metrics includes a resource allocation data obtained from the cloud resource provider server, a resource utilization data from the cloud resource monitoring server, a cost data obtained from the cloud resource metering server, and a performance data obtained from the cloud performance monitoring server.

3. The processor implemented method as claimed in claim 1, wherein the one or more current application metrics includes a business KPI data obtained from the business KPI dashboard.

4. The processor implemented method as claimed in claim 1, wherein the API endpoints of the cloud resource monitoring server are called to extract cloud resource monitoring data comprising CPU, storage metrics, network metrics, the API end points of the cloud resource metering server are called to extract cloud application specific cost data for instance specific cost data and service specific cost data, and wherein the API end points of the cloud performance monitoring server are called to extract a minimum CPU value, a maximum CPU value, an average CPU value, a minimum memory value, a maximum memory value, an average memory value, a volume metrics, a network metrics and wherein API endpoints of the application KPI dashboard are called to extract an application related KPIs comprising a number of transactions in an hour, a number of logins occurred in an hour, a number of registration requests placed in an hour, and wherein the API endpoint of the business KPI dashboard are called to extract business KPIs such as a number of orders placed, a revenue collected, a revenue recognized, an exit rate, a churn rate for a given time period.

5. A system (100) for generating key performance indicator (KPI) prediction model in multi-cloud application to monitor and configure various cloud-specific parameters for multi-cloud applications among multiple cloud service providers, wherein the system (100) comprising:

a memory (102) storing instructions;

one or more communication interfaces (106); and one or more hardware processors (104) coupled to the memory via the one or more communication interfaces (106), wherein the one or more hardware processors (104) are configured by the instructions to:

receive from a one or more multi-cloud hosted application a composite usage request to obtain one or more current resource consumption metrics and a cost structure for each cloud application identifier (ID), and simultaneously obtain a set of cloud application identities (ID) to fetch one or more associated resource metrics, a cloud provider name associated with each cloud account identity (ID), a current value of a key reference metric associated with each cloud application, a set of application programming interface (API) endpoints to fetch a current operating cloud metric and a current application metric, and a configuration data connecting each API end point metric;

invoke the set of API endpoints to obtain a plurality of usage tracking metrics for each cloud application ID based on an API endpoint calling structure, wherein for each API endpoint call an associated API response file is created and stored in an output metrics folder, and wherein each API response file includes data associated with each API endpoint, wherein the set of API endpoints include a cloud resource provider server, a cloud resource monitoring server, a cloud resource metering server, a cloud performance monitoring server, and an application KPI dashboard, wherein the set of API endpoints are called to obtain the plurality of usage tracking metrics for each cloud application ID from time series data for a predefined time period, wherein the time series data starts at a previous time in a time slice for every cycle of the predefined time period;

generate a mapping file and an error file for each cloud application ID of each API response file, by performing a meta scan on the output metrics folder, wherein to generate the mapping file and the error file for each API response file of the cloud application ID, the one or more hardware processors configured to:

extract for each cloud application ID one or more metatags from each API response file of each API endpoint associated with the output metrics folder;

create a set of mapping records for two or more identical metatags associated with each API response file and the cloud application ID, and creating a new file for one or more unidentical flagged metatags; and generate the mapping file and the error file for the two or more identical metatags corresponding to each API response file associated with the output metrics folder;

generate a plurality of relational tables comprising one or more records mapping in each API response file of each cloud application ID and loading the one or more records into a data staging model for flattening complex nested API response structure stored in the API response file;

generate a plurality of views for each cloud application ID by processing every record associated with each API response file with an allocated resource data, and performing cartesian product on one or more unprocessed record of each API response file, wherein the plurality of views comprises an application view, a summary view, and an application summary view;

compute an API endpoint correlation metric based on one or more composite metrics, and a composite KPI measure by applying correlation analytics on the plurality of views, wherein to compute the API endpoint correlation metrics, the one or more hardware processors are configured to:

obtain the plurality of views comprising the application view, the summary view, and the application summary view;

group (i) the resource allocation data, the resource utilization data, the cost data, and the performance data for a predefined interval of time, and (ii) the business KPI data for the predefined interval of time;

compute the one or more composite metrics by summing the resource utilization data multiplied with a first predefined value, the resource cost multiplied with the first predefined value, and the performance data multiplied with the first predefined value and assigning a weightage for the composite metrics;

compute the composite KPI measure by summing a first predefined business KPI value multiplied with a second predefined value, a second predefined business KPI value multiplied with a third predefined value, and a third business KPI value multiplied with a third predefined value;

generate the API endpoint correlation metrics by plotting the composite metrics and the business KPI value; and generate the business KPI view by plotting the composite metrics and the composite KPI measure; and generate a KPI prediction model leveraging autoregressive integrated moving average (ARIMA) on the composite KPI time series data to determine an optimized resource model and a predictive cost structure for each cloud application ID based on the application summary view and the API endpoint correlation metrics and generating a report for the plurality of views, determine the optimized resource model and the predictive cost structure for each cloud application ID by:

determining for each cloud application ID resource utilization, feeding historical correlation data to corresponding cloud provider's advisory services to obtain most optimized resource configurations, and after fetching the most optimized resource configurations, invoking corresponding cloud service provider's price engine APIs to obtain the predictive cost structure; and dynamically monitor the KPIs in real-time for multi-cloud applications from multiple cloud service providers by utilizing the optimized resource model and the predictive cost structure to assess achievable performance of the multi-cloud applications and to configure various cloud-specific parameters at time instances for multi-cloud applications among multiple cloud service providers.

6. The system 100 as claimed in claim 5, wherein the one or more current operating cloud metrics includes a resource allocation data obtained from the cloud resource provider server, a resource utilization data from the cloud resource monitoring server, a cost data obtained from the cloud resource metering server, and a performance data obtained from the cloud performance monitoring server.

7. The system 100 as claimed in claim 5, wherein the one or more current application metrics includes a business KPI data obtained from the business KPI dashboard.

8. One or more non-transitory machine-readable information storage mediums comprising one or more instructions which when executed by one or more hardware processors cause:

receiving from one or more multi-cloud hosted application, a composite usage request to obtain one or more current resource consumption metrics and a cost structure for each cloud application identifier (ID), and simultaneously obtaining a set of cloud application identities (ID) to fetch one or more associated resource metrics, a cloud provider name associated with each cloud account identity (ID), a current value of a key reference metric associated with each cloud application, a set of application programming interface (API) endpoints to fetch a current operating cloud metric and a current application metric, and a configuration data connecting each API end point metrics;

invoking the set of cloud provider API endpoints, to obtain a plurality of usage tracking metrics for each cloud application ID based on an API endpoint calling structure, wherein for each API endpoint call an associated API response file is created and stored in an output metrics folder, and wherein each API response file includes data associated with each API endpoint, wherein the set of API endpoints include a cloud resource provider server, a cloud resource monitoring server, a cloud resource metering server, a cloud performance monitoring server, and an application KPI dashboard, wherein the set of API endpoints are called to obtain the plurality of usage tracking metrics for each cloud application ID from time series data for a predefined time period, wherein the time series data starts at a previous time in a time slice for every cycle of the predefined time period;

generating for each API response file, a mapping file, and an error file for each cloud application ID by performing a meta scan on the output metrics folder, wherein the step of generating the mapping file and the error file for each API response file of the cloud application ID comprises:

extracting for each cloud application ID one or more metatags from each API response file of each API endpoint associated with the output metrics folder;

creating a set of mapping records for two or more identical metatags associated with each API response file and the cloud application ID, and creating a new file for one or more unidentical flagged metatags; and generating the mapping file and the error file for the two or more identical metatags corresponding to each API response file associated with the output metrics folder;

generating a plurality of relational tables comprising one or more records mapping in each API response file of each cloud application ID and loading the one or more records into a data staging model for flattening complex nested API response structure stored in each API response file;

generating a plurality of views for each cloud application ID by processing every record associated with each API response file with an allocated resource data, and performing cartesian product on one or more unprocessed record of each API response file, wherein the plurality of views comprises an application view, a summary view, and an application summary view;

computing an API endpoint correlation metric based on one or more composite metrics, and a composite KPI measure by applying correlation analytics on the plurality of views, wherein computing the API endpoint correlation metrics comprises:

obtaining the plurality of views comprising the application view, the summary view, and the application summary view;

grouping (i) the resource allocation data, the resource utilization data, the cost data, and the performance data for a predefined interval of time, and (ii) the business KPI data for the predefined interval of time;

computing the one or more composite metrics by summing the resource utilization data multiplied with a first predefined value, the resource cost multiplied with the first predefined value, and the performance data multiplied with the first predefined value and assigning a weightage for the composite metrics;

computing the composite KPI measure by summing a first predefined business KPI value multiplied with a second predefined value, a second predefined business KPI value multiplied with a third predefined value, and a third business KPI value multiplied with a third predefined value;

generating the API endpoint correlation metrics by plotting the composite metrics and the business KPI value; and generating the business KPI view by plotting the composite metrics and the composite KPI measure; and generating a KPI prediction model leveraging an autoregressive integrated moving average (ARIMA) on the composite KPI time series data to determine an optimized resource model and a predictive cost structure for each cloud application ID based on the application summary view and the API endpoint correlation metrics and generates a report for the plurality of views, determining the optimized resource model and the predictive cost structure for each cloud application ID by:

determining for each cloud application ID, resource utilization, and feeding historical correlation data to corresponding cloud provider's advisory services to obtain most optimized resource configurations, and after fetching the most optimized resource configuration, invoking corresponding cloud service provider's price engine APIs to obtain the predictive cost structure; and dynamically monitoring the KPIs in real-time for multi-cloud applications from multiple cloud service providers by utilizing the optimized resource model and the predictive cost structure to assess achievable performance of the multi-cloud applications and to configure various cloud-specific parameters at time instances for multi-cloud applications among multiple cloud service providers.

9. The one or more non-transitory machine-readable information storage mediums of claim 8, wherein the one or more current operating cloud metrics includes a resource allocation data obtained from the cloud resource provider server, a resource utilization data from the cloud resource monitoring server, a cost data obtained from the cloud resource metering server, and a performance data obtained from the cloud performance monitoring server.

10. The one or more non-transitory machine-readable information storage mediums of claim 8, wherein the one or more current application metrics includes business KPI data obtained from the business KPI dashboard.

\* \* \* \* \*